US008407709B2

(12) United States Patent
Inari

(10) Patent No.: US 8,407,709 B2
(45) Date of Patent: Mar. 26, 2013

(54) METHOD AND APPARATUS FOR BATCH SCHEDULING, AND COMPUTER PRODUCT

(75) Inventor: Tomohide Inari, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1577 days.

(21) Appl. No.: 11/192,137

(22) Filed: Jul. 29, 2005

(65) Prior Publication Data

US 2006/0248533 A1 Nov. 2, 2006

(30) Foreign Application Priority Data

Apr. 28, 2005 (JP) ................. 2005-132899

(51) Int. Cl.
*G06F 9/46* (2006.01)
*G06F 9/45* (2006.01)
*G06F 7/00* (2006.01)
*G06F 7/38* (2006.01)

(52) U.S. Cl. ........ 718/103; 718/101; 718/104; 717/149; 708/200; 708/524

(58) Field of Classification Search ............. 718/1–105; 717/141–151; 708/100, 200, 524
See application file for complete search history.

(56) References Cited

U.S. PATENT DOCUMENTS

| | | | | |
|---|---|---|---|---|
| 5,752,030 A | * | 5/1998 | Konno et al. | 718/102 |
| 5,752,031 A | * | 5/1998 | Cutler et al. | 718/103 |
| 5,781,787 A | * | 7/1998 | Shafer et al. | 712/28 |
| 5,944,778 A | * | 8/1999 | Takeuchi et al. | 718/100 |
| 6,049,817 A | * | 4/2000 | Schoen et al. | 718/102 |
| 6,636,949 B2 | * | 10/2003 | Barroso et al. | 711/141 |
| 7,082,606 B2 | * | 7/2006 | Wood et al. | 718/102 |
| 7,340,742 B2 | * | 3/2008 | Tabuchi | 718/103 |
| 7,519,966 B2 | * | 4/2009 | Kawachiya et al. | 718/100 |
| 7,788,731 B2 | * | 8/2010 | Morris et al. | 726/34 |
| 2002/0002578 A1 | * | 1/2002 | Yamashita | 709/105 |
| 2003/0036884 A1 | * | 2/2003 | Orii | 702/186 |
| 2003/0037091 A1 | * | 2/2003 | Nishimura et al. | 709/103 |
| 2003/0149717 A1 | * | 8/2003 | Heinzman | 709/101 |
| 2004/0015978 A1 | * | 1/2004 | Orii | 718/105 |
| 2004/0064817 A1 | * | 4/2004 | Shibayama et al. | 718/104 |
| 2004/0078407 A1 | * | 4/2004 | Naslund et al. | 708/492 |
| 2005/0001840 A1 | * | 1/2005 | Stephenson et al. | 345/443 |
| 2006/0149851 A1 | * | 7/2006 | Matsumoto et al. | 709/238 |
| 2008/0155233 A1 | * | 6/2008 | Ward et al. | 712/220 |

FOREIGN PATENT DOCUMENTS

JP HEI 8-16410 A 1/1996

(Continued)

OTHER PUBLICATIONS

Japanese Office Action mailed Mar. 16, 2010 and issued in corresponding Japanese Patent Application 2005-132899.

(Continued)

*Primary Examiner* — Abdullah Al Kawsar
(74) *Attorney, Agent, or Firm* — Staas & Halsey LLP

(57) ABSTRACT

A batch scheduling apparatus that performs a scheduling of a parallel program to be executed as a batch job by a parallel computer includes a priority determining unit that determines a priority of the parallel program based on an index that indicates a level of utilization of the parallel computer by the parallel program; and a scheduling unit that schedules the parallel program based on the priority determined.

6 Claims, 12 Drawing Sheets

FOREIGN PATENT DOCUMENTS

| | | |
|---|---|---|
| JP | 9-330237 | 12/1997 |
| JP | 10-143380 | 5/1998 |
| JP | 11-24949 | 1/1999 |
| JP | 11-249917 | 9/1999 |
| JP | 2002-157232 | 5/2002 |
| JP | 2002-175288 | 6/2002 |
| JP | 2003-256221 | 9/2003 |

OTHER PUBLICATIONS

Japanese Office Action issued Aug. 31, 2009 in corresponding Japanese Patent Application 2005-132899.

* cited by examiner

FIG.2

JOB TOTAL INFORMATION
- PROGRAM NAME (FIXED LENGTH CHARACTER STRING)
- TOTAL PARALLEL NUMBER (N)
- FLOATING POINT OPERATION PERFORMANCE [Mflops]
- CACHE MISS RATE [%]

CPU INDIVIDUAL INFORMATION
- Cpu1 - EXECUTION TIME
- Cpu2 - EXECUTION TIME
- ...
- CpuN - EXECUTION TIME

FIG.3A

PARALLELIZATION EFFICIENCY

PARALLELIZATION EFFICIENCY=(TOTAL EXECUTION TIME OF N PARALLELS)÷(MAXIMUM EXECUTION TIME OF N PARALLELS)÷(TOTAL PARALLEL NUMBER N)

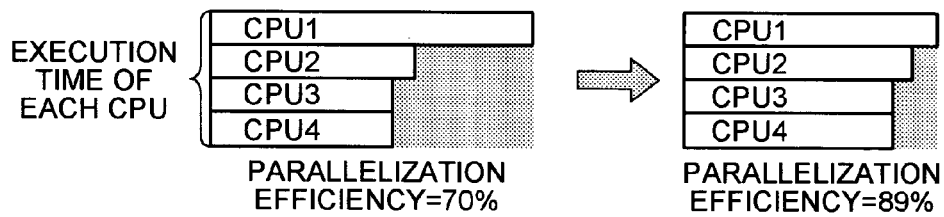

EXECUTION TIME OF EACH CPU: CPU1, CPU2, CPU3, CPU4

PARALLELIZATION EFFICIENCY=70% → PARALLELIZATION EFFICIENCY=89%

FIG.3B

FLOATING POINT OPERATION PERFORMANCE

FLOATING POINT OPERATION PERFORMANCE= (TOTAL NUMBER OF FLOATING POINT OPERATIONS FOR ALL CPUS) ÷(TOTAL EXECUTION TIME OF ALL CPUS) [Flop/sec]

FIG.3C

CACHE MISS RATE

CACHE MISS RATE=(TOTAL NUMBER OF CACHE MISSES FOR ALL CPUS) ÷(TOTAL NUMBER OF INSTRUCTIONS EXECUTED BY ALL CPUS) × 100 [%]

| PROGRAM NAME (FIXED LENGTH CHARACTER STRING) |
| --- |
| NUMBER OF REGISTERED ITEMS |
| AVERAGE FLOATING POINT OPERATION PERFORMANCE [Mflops] |
| AVERAGE CACHE MISS RATE [%] |
| AVERAGE PARALLELIZATION EFFICIENCY |

| PROGRAM NAME (FIXED LENGTH CHARACTER STRING) |
|---|
| AVERAGE FLOATING POINT OPERATION PERFORMANCE [Mflops] |
| AVERAGE CACHE MISS RATE [%] |
| AVERAGE PARALLELIZATION EFFICIENCY |

FINAL REFERENCE VALUE OF EACH PERFORMANCE INDEX

| PROCESSING DATE |
|---|
| AVERAGE FLOATING POINT OPERATION PERFORMANCE [Mflops] |
| AVERAGE CACHE MISS RATE [%] |
| AVERAGE PARALLELIZATION EFFICIENCY |

| PROGRAM NAME (FIXED LENGTH CHARACTER STRING) |
| --- |
| AVERAGE FLOATING POINT OPERATION PERFORMANCE [Mflops] |
| AVERAGE CACHE MISS RATE [%] |
| AVERAGE PARALLELIZATION EFFICIENCY |

| PROGRAM NAME (FIXED LENGTH CHARACTER STRING) |
| --- |
| REGISTRATION DATE |
| AVERAGE FLOATING POINT OPERATION PERFORMANCE [Mflops] |
| AVERAGE CACHE MISS RATE [%] |
| AVERAGE PARALLELIZATION EFFICIENCY |
| EXECUTION PRIORITY |

METHOD AND APPARATUS FOR BATCH SCHEDULING, AND COMPUTER PRODUCT

BACKGROUND OF THE INVENTION

1. Field of the Invention

The present invention relates to a technology for scheduling a parallel program that is executed as a batch job by a parallel computer.

2. Description of the Related Art

Conventionally, according to parallel computer systems that execute programs in parallel using plural central processing units (CPUs), the parallel computer system schedules batch jobs based on an idle state of each computer resource such as a CPU and a computer resource requested by each batch job, from among parallel program groups input by users in a batch job format.

FIG. 18 is an explanatory diagram of a batch job scheduling performed by a parallel computer system. As shown in FIG. 18, batch requests input by the users in a batch job format are stored in an execution queue. A batch scheduler 300 selects a batch request from the execution queue based on an idle state of a computer resource and a computer resource registered by each batch job, and gives a right of executing the selected batch.

Japanese Patent Application Laid-Open No. H8-016410 discloses a technique of scheduling jobs as follows. Jobs waiting for the execution and jobs in execution are managed based on plural queues of jobs. A queue to which each job belongs and a priority of each job within the queue are set based on an amount of the computer resource required by each job, and a waiting time, and the like. The jobs are scheduled by dynamically reviewing the queue to which each job belongs and the priority within the queue.

However, even when the priorities of the jobs are determined based on the amount of the computer resource required by each job, the waiting time, and the like, the parallel computers cannot be efficiently used unless parallelism of the parallel programs are efficiently utilized. In other words, unless the parallel programs efficiently use the parallel computers, the performance of the parallel computers cannot be fully exhibited.

SUMMARY OF THE INVENTION

It is an object of the present invention to at least solve the problems in the conventional technology.

A computer-readable recording medium according to one aspect of the present invention stores a computer program for scheduling a parallel program to be executed as a batch job by a parallel computer. The computer program causes a computer to execute determining a priority of the parallel program based on an index that indicates a level of utilization of the parallel computer by the parallel program; and scheduling the parallel program based on the priority determined.

A method according to another aspect of the present invention, which is for scheduling a parallel program to be executed as a batch job by a parallel computer, includes determining a priority of the parallel program based on an index that indicates a level of utilization of the parallel computer by the parallel program; and scheduling the parallel program based on the priority determined.

A batch scheduling apparatus according to still another aspect of the present invention, which performs a scheduling of a parallel program to be executed as a batch job by a parallel computer, includes a priority determining unit that determines a priority of the parallel program based on an index that indicates a level of utilization of the parallel computer by the parallel program; and a scheduling unit that schedules the parallel program based on the priority determined.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a table of job accounting information that is stored for each job in a job-accounting-information database (DB);

FIG. 3A to FIG. 3C depict a definition of parallelization efficiency, a definition of floating point operation performance, and a definition of a cache miss rate respectively calculated by a performance aggregating unit as performance indices;

DETAILED DESCRIPTION OF THE PREFERRED EMBODIMENTS

Exemplary embodiments of the present invention will be explained in detail below with reference to the accompanying drawings. In the specification, a parallel program is simply referred to as a program.

Figure 1:
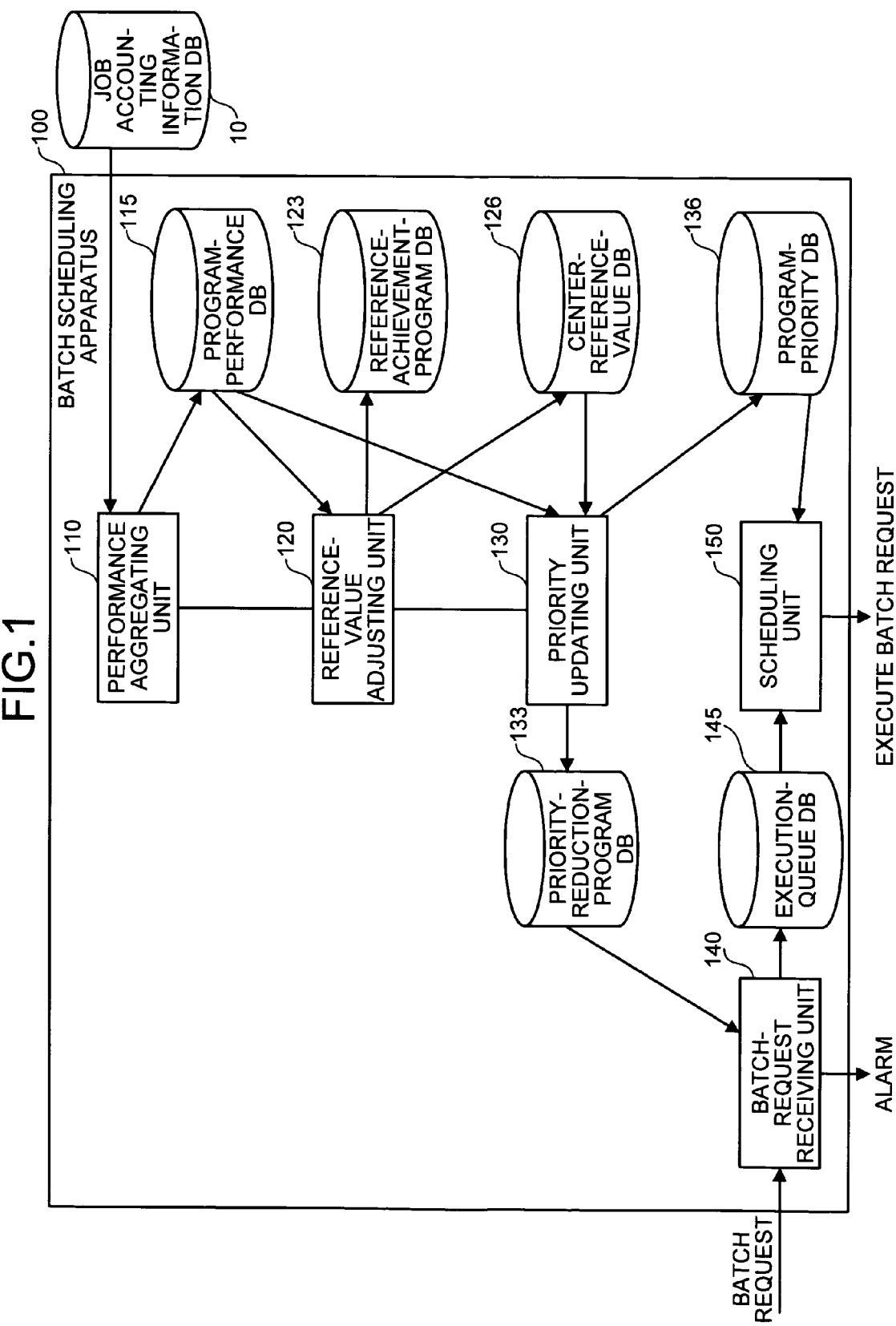
FIG. 1 is a functional block diagram of a configuration of a batch scheduling apparatus according to an embodiment of the present invention.

FIG. 1 is a functional block diagram of the configuration of the batch scheduling apparatus according to an embodiment of the present invention. As shown in FIG. 1, a batch scheduling apparatus 100 includes a performance aggregating unit 110, a program-performance DB 115, a reference-value adjusting unit 120, a reference-achievement-program DB 123, a center-reference-value DB 126, a priority updating unit 130, a priority-reduction-program DB 133, a program-priority DB 136, a batch-request receiving unit 140, an execution-queue DB 145, and a scheduling unit 150.

The performance aggregating unit 110 calculates a performance index that shows a level of efficient utilization of a parallel computer for each program based on job accounting information stored in a job-accounting-information DB 10, and stores the performance index into the program-performance DB 115.

FIG. 2 is a table of job accounting information that is stored for each job in the job-accounting-information DB 10. As shown in FIG. 2, the job accounting information contains a program name of a program that is executed as a job, a total parallel number (N) indicating the number of CPUs that are used in parallel, floating point operation performance, a cache miss rate, and execution time of N CPUs, from Cpu1–execution time to CpuN–execution time.

The floating point operation performance is an index that shows floating point operation performance of one CPU. The floating point operation performance is defined as (a total number of floating point operations for all CPUs)÷(a total execution time of all CPUs), that is, Flop/sec. Based on this index, the floating point operation performance per one CPU is evaluated. The cache miss rate is an index that shows utilization efficiency of a cache. The cache miss rate is defined as (a total number of cache misses for all CPUs)÷(a total number of instructions executed by all CPUs)×100, as a percentage.

FIG. 3A to FIG. 3C depict a definition of parallelization efficiency, a definition of floating point operation performance, and a definition of a cache miss rate respectively calculated by the performance aggregating unit 110 as performance indices. FIG. 3A depicts a definition of parallelization efficiency. FIG. 3B depicts a definition of floating point operation performance. FIG. 3C depicts a definition of a cache miss rate.

As shown in FIG. 3A, the parallelization efficiency is an index that shows parallel performance. The parallelization efficiency is defined as (a total execution time of N parallels)÷(a maximum execution time of N parallels)÷(a total parallel number N). Based on this index, the effect of the number of CPUs that are parallelized is evaluated. In FIG. 3A, two parallelization efficiencies of 70% and 89% are shown. A higher value of parallelization efficiency indicates higher performance. The performance aggregating unit 110 aggregates the parallelization efficiency, the floating point operation performance, and the cache miss rate as performance indices.

Figures 4, 5:
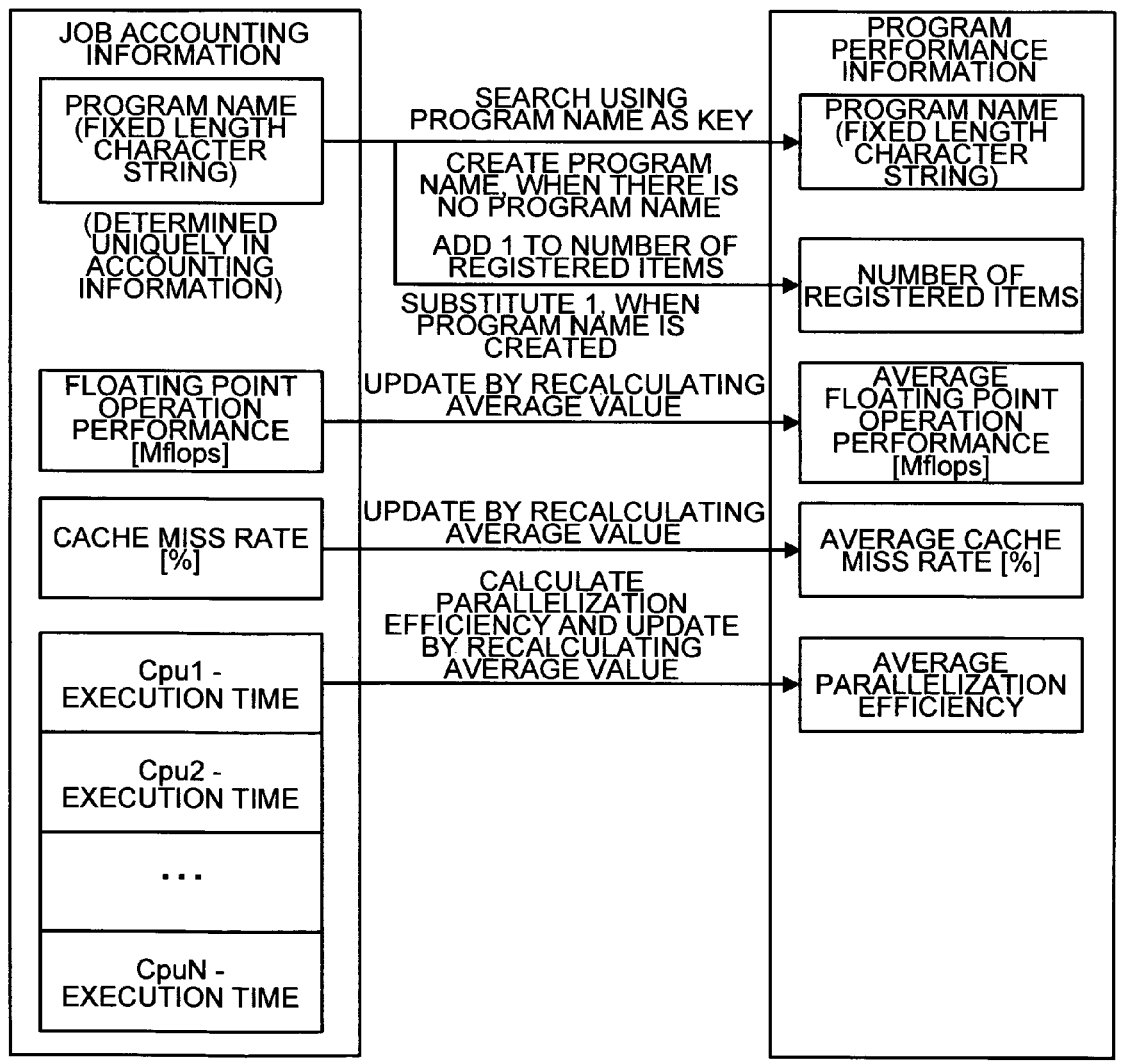
FIG. 4 is a table of program performance information that is stored for each program in a program-performance DB.
FIG. 5 is an explanatory diagram of program performance information calculated by the performance aggregating unit based on the job accounting information.

The program-performance DB 115 is a storage unit that stores the performance indices calculated by the performance aggregating unit 110 for each program as program performance information. FIG. 4 is a table of program performance information that is stored for each program in the program-performance DB 115. As shown in FIG. 4, a program name, the number of registered items, average floating point operation performance, an average cache miss rate, and average parallelization efficiency are stored as program performance information, into the program-performance DB 115.

The number of registered items is the number of pieces of job accounting information stored in the job-accounting-information DB 10 for each program. The average floating point operation performance, the average cache miss rate, and the average parallelization efficiency are average values of the floating point operation performance, the cache miss rate, and the parallelization efficiency respectively included in the job accounting information of the number of registered items.

FIG. 5 is an explanatory diagram of program performance information calculated by the performance aggregating unit 110 based on the job accounting information. As shown in FIG. 5, the performance aggregating unit 110 extracts each one piece of job accounting information from the job-accounting-information DB 10, and updates the program performance information. Specifically, when a program name of the job accounting information extracted from the job-accounting-information DB 10 is not registered in the program-performance DB 115, the performance aggregating unit 110 creates a new entry, sets the number of registered items to "1", and adds "1" to the number of registered items if the program name is registered.

The performance aggregating unit 110 recalculates an average value of the floating point operation performance using the average floating point operation performance and the number of registered items in the program performance information, and the floating point operation performance in the job accounting information, thereby updating the average floating point operation performance. Further, the performance aggregating unit 110 recalculates an average value of the cache miss rate using the average cache miss rate and the number of registered items in the program performance information, and the cache miss rate in the job accounting information, thereby updating the average cache miss rate.

The performance aggregating unit 110 calculates the parallelization efficiency using the Cpu1–execution time to the CpuN–execution time in the job accounting information, and recalculates an average value of the parallelization efficiency using the average parallelization efficiency and the number of registered items in the program performance information, and the calculated parallelization efficiency, thereby updating the average parallelization efficiency.

The reference-value adjusting unit 120 adjusts the reference value of the performance index of the center of the parallel computers so that the number of selected programs becomes constant, using the program-performance DB 115, and stores the adjusted reference value into the center-reference-value DB 126. The selected programs are those of which priorities are "high". The batch scheduling apparatus 100 according to the present embodiment basically sets priorities of the programs to "high" or "low", sets "high" priorities to a constant number of programs starting from the highest performance index, and sets values of the performance indices satisfied by the selected programs to the reference values.

Figures 6, 7, 8:
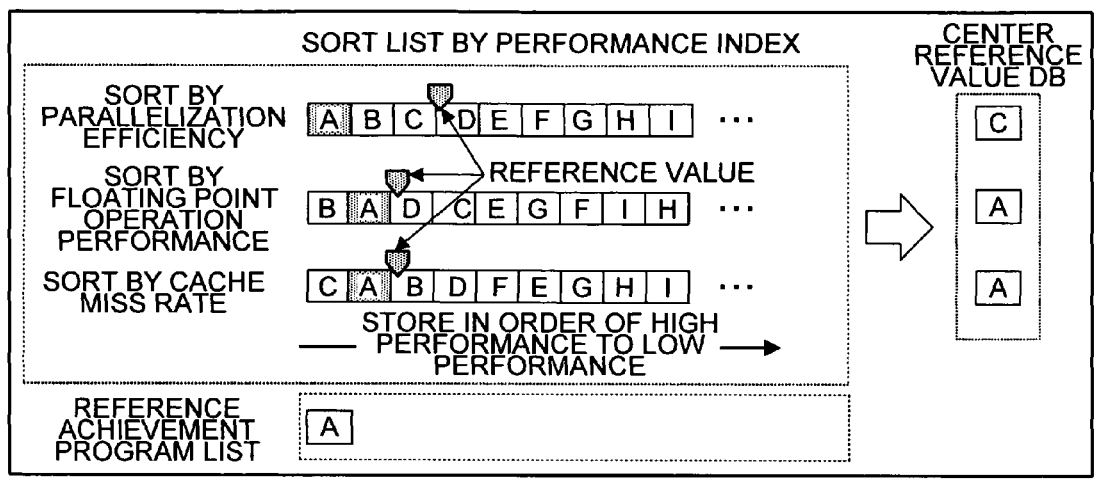
FIG. 6 is an explanatory diagram of a reference-value adjustment processing performed by a reference-value adjusting unit.
FIG. 7 is a table of program information that is stored for each reference achievement program in a reference-achievement-program DB.
FIG. 8 is a table of reference value information that is stored for each day in a center-reference-value DB.

FIG. 6 is an explanatory diagram of a reference-value adjustment processing performed by the reference-value adjusting unit 120. As shown in FIG. 6, the reference-value adjusting unit 120 prepares a list in which programs, whose program performance information is stored in the program-performance DB 115, are sorted by the parallelization efficiency, the floating point operation performance, and the cache miss rate respectively, and sets the value of the performance index of the head program as a first reference value.

Assume that any one of performance indices of a program becomes a reference value after the level is decreased by one level. When other performance indices of this program achieve reference values, all reference values are regarded to be achieved. Then, the information of this program is added to the reference achievement program list. The order of performance indices of which reference values are changed is not fixed. A weight can be also added according to the operation policy of the center (about which performance index is to be regarded important). It is assumed that the reference-value adjusting unit 120 adjusts the reference value once a day. It is also possible to adjust the reference value at other frequencies, for example, once a week.

In FIG. 6, a program A is stored in the reference achievement program list at a stage where the parallelization efficiency of a program C is a reference value of the parallelization efficiency of the center and the floating point operation performance and the cache miss rate of the program A are reference values of the floating point operation performance and the cache miss rate of the center respectively.

When the number of programs in the reference achievement program list becomes constant, the reference-value adjusting unit 120 ends the reference-value adjustment processing. As described later, the priority of the program in the reference achievement program list becomes "high".

When the reference-value adjusting unit 120 adjusts the reference value so that the number of programs in the reference achievement program list becomes constant, the number of programs of which priorities become "high" can be made constant.

The reference-achievement-program DB 123 is a storage unit that stores the reference achievement program list. FIG. 7 is a table of program information that is stored for each reference achievement program in the reference-achievement-program DB 123.

As shown in FIG. 7, a program name, average floating point operation performance, an average cache miss rate, and average parallelization efficiency are stored for each program in the reference-achievement-program DB 123.

The center-reference-value DB 126 is a storage unit that stores a reference value adjusted by the reference-value adjusting unit 120. FIG. 8 is a table of reference value information that is stored for each day in the center-reference-value DB 126. As shown in FIG. 8, a processing date when a reference-value adjustment processing is performed, and average floating point operation performance, an average cache miss rate, and average parallelization efficiency that become reference values are stored as reference value information for each day in the center-reference-value DB 126.

The priority updating unit 130 updates the priority of each program stored in the program-priority DB 136 using the program-performance DB 115 and the center-reference-value DB 126. That is, values of performance indices of each program stored in the program-performance DB 115 are compared with reference values stored in the center-reference-value DB 126. When all values of the performance indices of a program are equal to or higher than the reference values, the priority of this program is set to "high". When a value of even one of the performance indices does not satisfy a reference value, the priority of this program is set to "low". The priority updating unit 130 stores the information of a program, of which priority is updated from "high" to "low", into the priority-reduction-program DB 133.

When the priority updating unit 130 updates the priority of a program based on a value of a performance index and a reference value of each program, the priority of the program can be determined based on a level of effective utilization of a parallel computer.

Figures 9, 10:
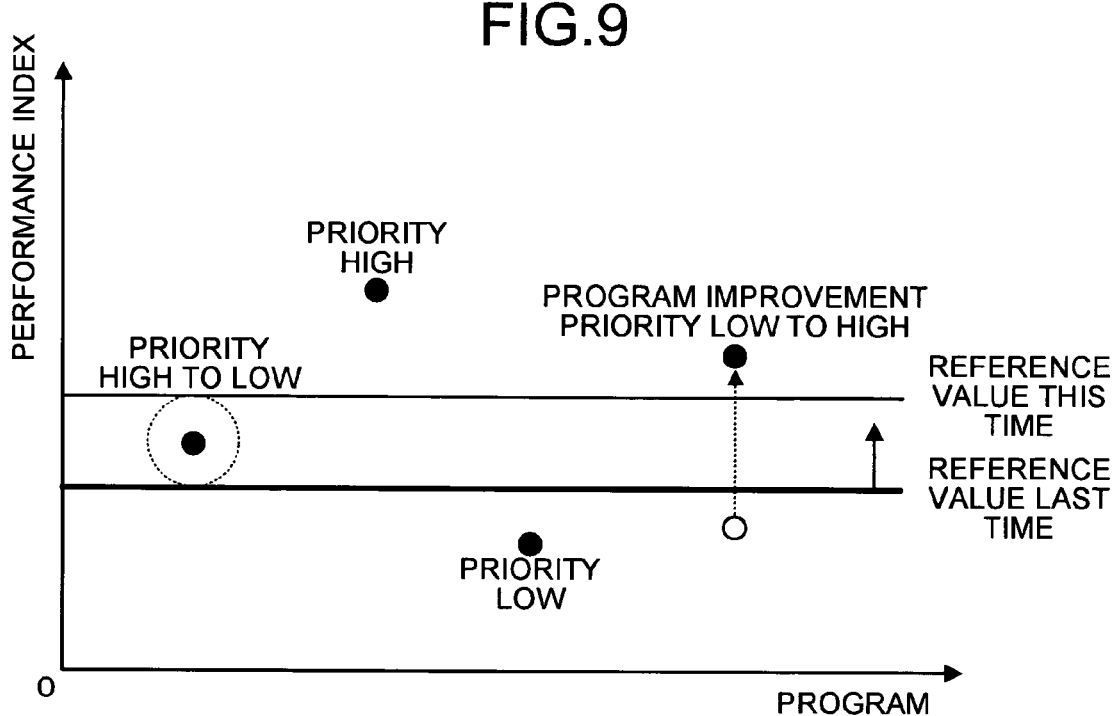
FIG. 9 is an explanatory diagram of increasing a reference value based on updating of priority.
FIG. 10 is a table of program information that is stored for each priority reduction program in a priority-reduction-program DB.

FIG. 9 is an explanatory diagram of increasing a reference value based on updating of priority. As shown in FIG. 9, when the performance of each program is improved, total reference values are raised since the number of programs of which priorities are "high" is constant. As a result, the priority of a program which is "high" based on a reference value last time may be changed to "low" based on a reference value this time.

The priority-reduction-program DB 133 is a storage unit that information of a priority reduction program whose priority is changed from "high" to "low". FIG. 10 is a table of program information that is stored for each priority reduction program in the priority-reduction-program DB 133. As shown in FIG. 10, a program name, average floating point operation performance, an average cache miss rate, and average parallelization efficiency are stored for each priority reduction program in the priority-reduction-program DB 133.

Figures 11, 12:
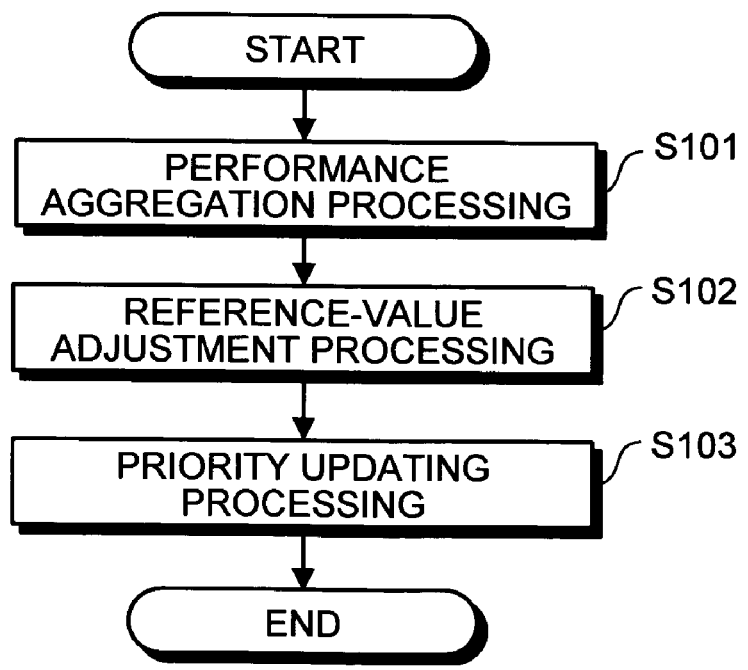
FIG. 11 is a table of priority information that is stored for each program in a program-priority DB.
FIG. 12 is a flowchart of a processing procedure of a priority determination processing performed by the batch scheduling apparatus according to the present embodiment.

The program-priority DB 136 is a storage unit that stores a priority of a program as priority information. FIG. 11 is a table of priority information that is stored for each program in the program-priority DB 136. As shown in FIG. 11, a program name, a registration date, average floating point operation performance, an average cache miss rate, average parallelization efficiency, and execution priority are stored for each program in the program-priority DB 136. The registration date is the date when a program is registered in the program-priority DB 136. The execution priority is a priority of a program.

The batch-request receiving unit 140 receives a request for executing a program by a parallel computer from a user as a batch request. The batch-request receiving unit 140 refers to the priority-reduction-program DB 133 at the time of receiving a batch request from the user. When the priority of a program of which execution is requested by the user becomes low, the batch-request receiving unit 140 issues an alarm to the user.

When the priority of a program of which execution is requested by the user becomes low when referring to the priority-reduction-program DB 133, the batch-request receiving unit 140 issues an alarm to the user, thereby motivating the user to improve the performance of the program.

At the time of receiving a batch request from the user, when the priority of a program decreases, the batch-request receiving unit 140 issues an alarm to the user. Alternatively, when the priority of a program decreases at the time of updating the priority, the priority updating unit 130 can issue an alarm to the user about this program.

The execution-queue DB 145 is a storage unit that stores a batch request received by the batch-request receiving unit 140 from a user. The scheduling unit 150 extracts a batch request having a highest priority from the batch requests stored in the execution-queue DB 145, based on the program-priority DB 136, and gives an execution right to this batch request.

FIG. 12 is a flowchart of a processing procedure of the priority determination processing performed by the batch scheduling apparatus 100 according to the present embodiment.

As shown in FIG. 12, in the batch scheduling apparatus 100, the performance aggregating unit 110 aggregates the performance indices of each program using the job accounting information in the job-accounting-information DB 10, and stores the aggregate performance indices into the program-performance DB 115 (step S101).

The reference-value adjusting unit 120 adjusts a reference value so that the number of programs of which priorities are "high" becomes constant based on the program performance information of each program stored in the program-performance DB 115, and stores the reference value into the center-reference-value DB 126. The reference-value adjusting unit 120 stores a program that achieves the reference value into the reference-achievement-program DB 123 (step S102).

The priority updating unit 130 updates the priority of each program in the program-priority DB 136 based on the program performance information of each program stored in the program-performance DB 115 and the reference value stored in the center-reference-value DB 126, and stores the information of a priority reduction program of which priority decreases into the priority-reduction-program DB 133 (step S103).

As described above, the performance aggregating unit 110 aggregates the performance indices of each program using the job accounting information. The reference-value adjusting unit 120 adjusts the reference value based on the value of a performance index of each program. The priority updating unit 130 updates the priority of each program based on the program performance information of each program and the reference value. With this arrangement, the priority of each program can be determined based on a level of effective utilization of a parallel computer.

Figure 13:
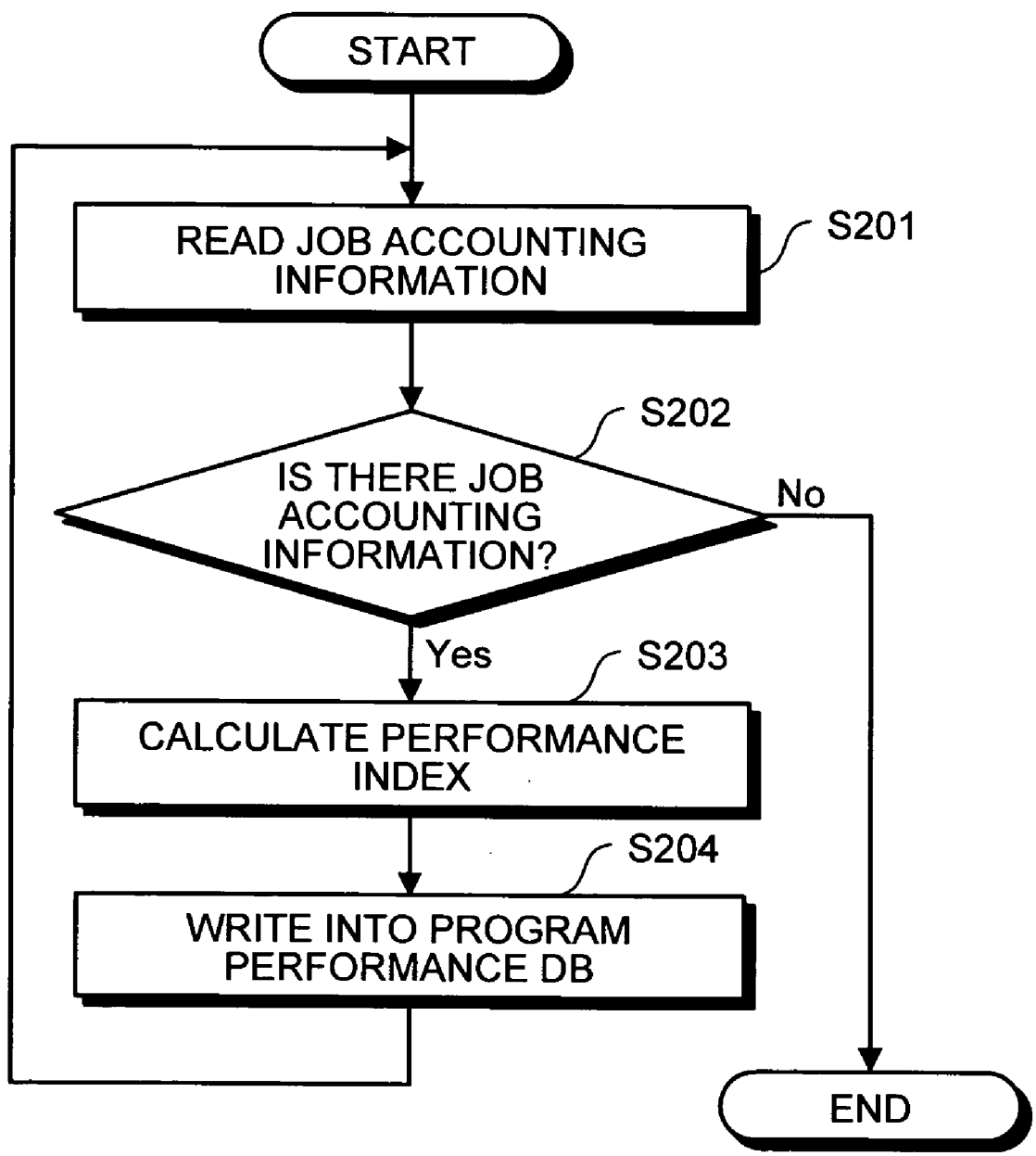
FIG. 13 is a flowchart of a processing procedure of a performance aggregation processing performed by the performance aggregating unit.

FIG. 13 is a flowchart of a processing procedure of the performance aggregation processing performed by the performance aggregating unit 110. As shown in FIG. 13, in the performance aggregation processing, the performance aggregating unit 110 reads each one piece of job accounting information from the job-accounting-information DB 10 (step S201), and determines whether job accounting information is present (step S202).

When job accounting information is not present, the performance aggregating unit 110 ends the processing. When job accounting information is present, the performance aggregating unit 110 calculates a performance index (step S203), and writes the performance index into the program-performance DB 115 (step S204). The process returns to step S201, and the performance aggregating unit 110 reads the next job accounting information.

As described above, when the performance aggregating unit 110 calculates the performance index using the job accounting information, a performance index of each program can be obtained based on actual data.

Figure 14:
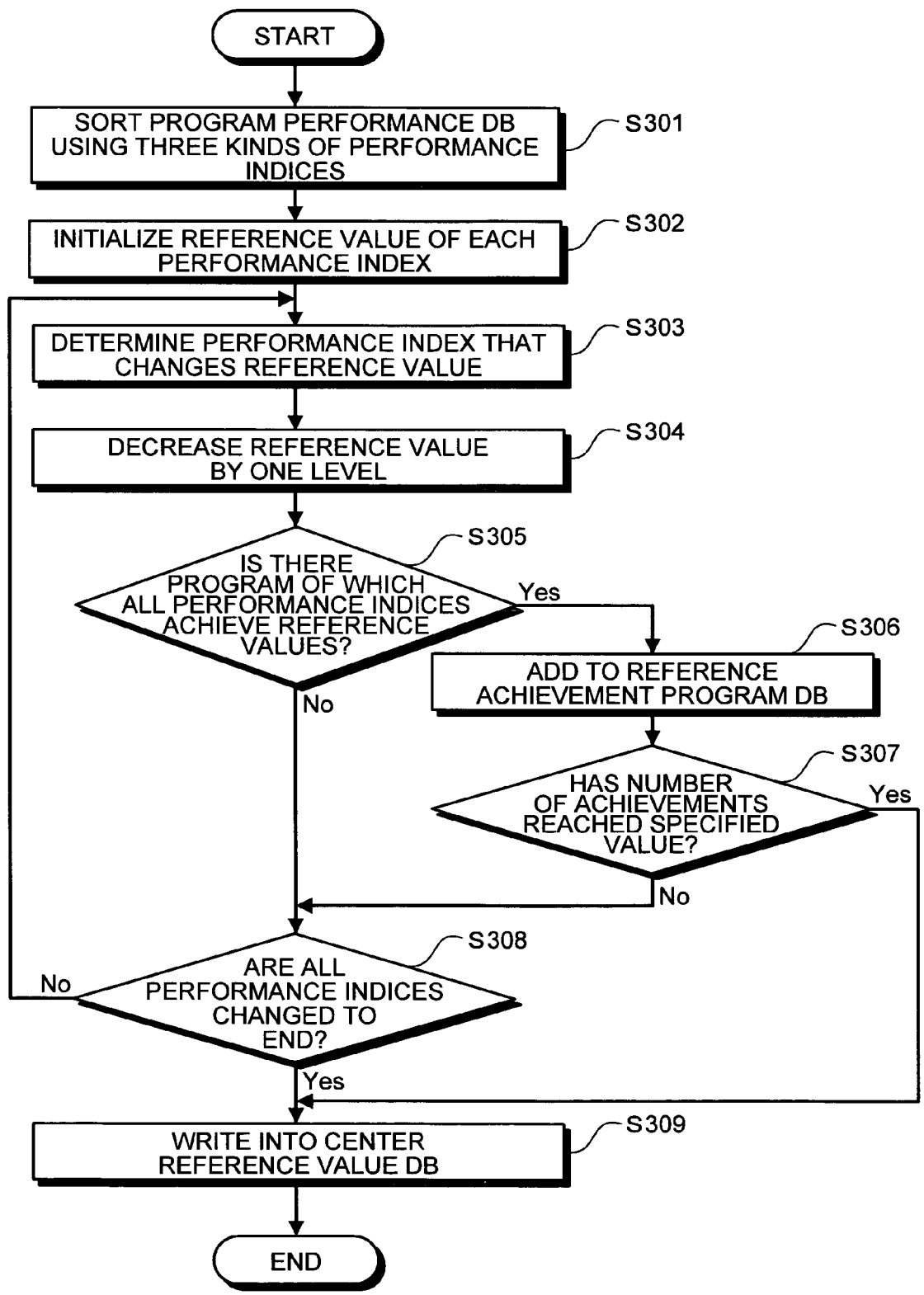
FIG. 14 is a flowchart of a processing procedure of a reference-value adjustment processing performed by the reference-value adjusting unit.

FIG. 14 is a flowchart of a processing procedure of the reference-value adjustment processing performed by the reference-value adjusting unit 120. As shown in FIG. 14, in the reference-value adjustment processing, the reference-value adjusting unit 120 sorts programs of which program performance information is stored in the program-performance DB 115 using three kinds of performance indices (step S301). The reference-value adjusting unit 120 also initializes the reference value of each performance index (step S302), determines a performance index that changes the reference value (step S303), and decreases the reference value of the determined performance index by one level (step S304).

The reference-value adjusting unit 120 determines whether a program of which all performance indices achieve reference values is present (step S305). When a program of which all performance indices achieve the reference values is present, the reference-value adjusting unit 120 adds the program that achieves the reference values to the reference-achievement-program DB 123 (step S306). The reference-value adjusting unit 120 determines whether the number of programs that achieve the reference values reaches a specified value (step S307). When the number of programs that achieve the reference values reaches a specified value, the reference-value adjusting unit 120 writes the current reference value into the center-reference-value DB 126 (step S309), and ends the processing.

On the other hand, when the number of programs that achieve reference values does not reach a specified value and also when a program of which all performance indices achieve reference values is not present, the reference-value adjusting unit 120 determines whether all performance indices are changed to the end (step S308). When all performance indices are not changed to the end, the process returns to step S303. When all performance indices are changed to the end, the reference-value adjusting unit 120 writes the current reference value into the center-reference-value DB 126 (step S309), and ends the processing.

As described above, when the reference-value adjusting unit 120 adjusts the reference values of the performance indices, the priorities of a constant number of programs can be set to "high" while increasing the reference values along with the improvement of the programs.

Figure 15:
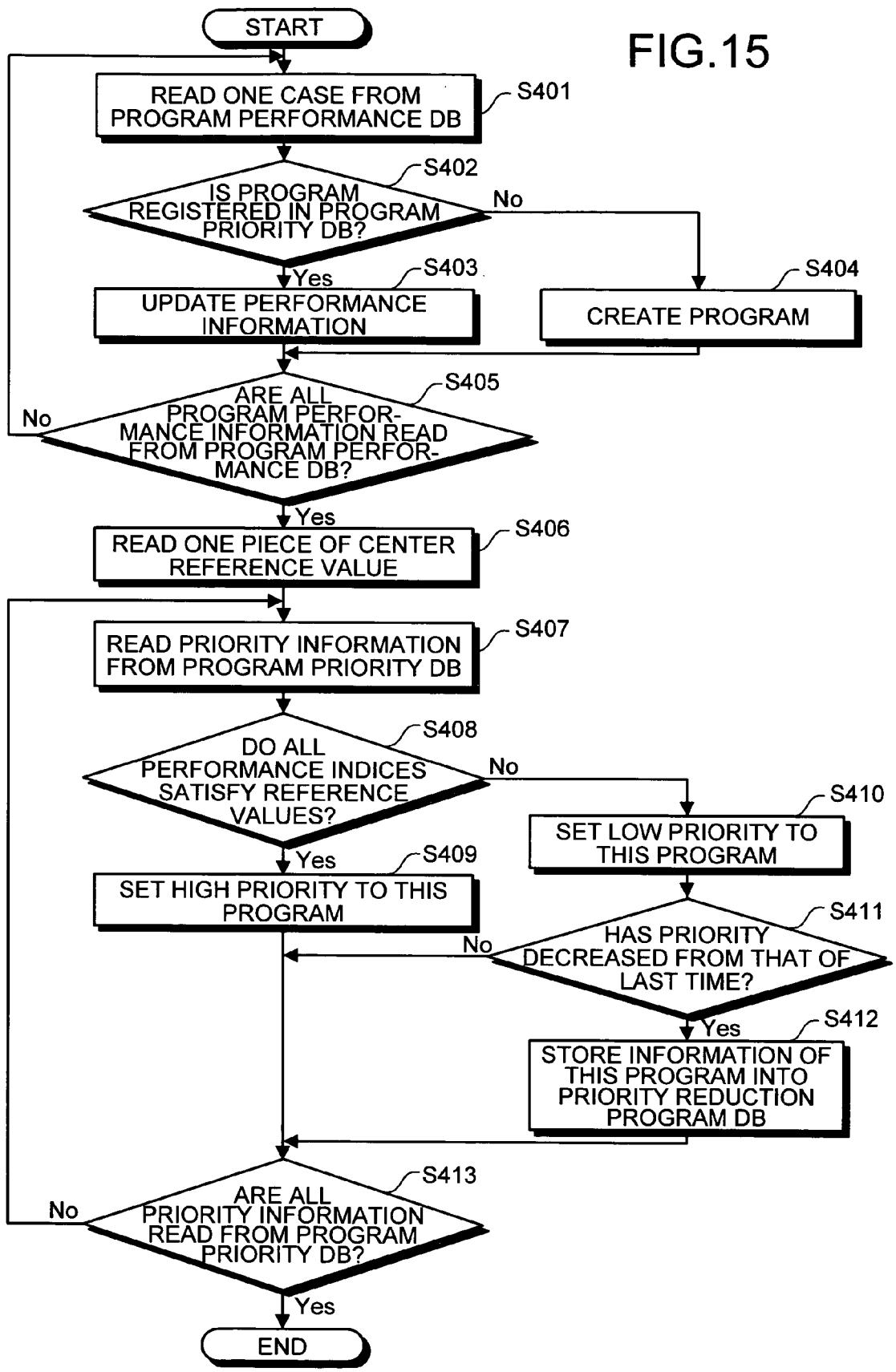
FIG. 15 is a flowchart of a processing procedure of a priority updating processing performed by a priority updating unit.

FIG. 15 is a flowchart of a processing procedure of the priority updating processing performed by the priority updating unit 130. As shown in FIG. 15, in the priority updating processing, the priority updating unit 130 reads each one piece of program performance information from the program-performance DB 115 (step S401), and determines whether a program of which program performance information is read is already registered in the program-priority DB 136 (step S402).

When a program of which program performance information is read is already registered in the program-priority DB 136, the priority updating unit 130 updates the performance information including the average floating point operation performance, the average cache miss rate, and the average parallelization efficiency, in the program-priority DB 136 (step S403). When a program of which program performance information is read is not yet registered in the program-priority DB 136, the priority updating unit 130 registers the performance information of the program into the program-priority DB 136 (step S404).

The priority updating unit 130 determines whether all program performance information is read from the program-performance DB 115 (step S405). When all program performance information are not read from the program-performance DB 115, the process returns to step S401, and the priority updating unit 130 reads the next program performance information.

On the other hand, when all program performance information are read from the program-performance DB 115, the priority updating unit 130 reads the reference value from the center-reference-value DB 126 (step S406), and reads priority information of each program from the program-priority DB 136 (step S407).

The priority updating unit 130 determines whether values of all performance indices contained in the priority information of the program satisfy reference values (step S408). When all performance indices satisfy the reference values, the priority updating unit 130 sets a high priority to this program (step S409). When any one of the performance indices does not satisfy the reference value, the priority updating unit 130 sets a low priority to this program (step S410). When the priority decreases from that of the last time, the priority updating unit 130 stores the information of this program into the priority-reduction-program DB 133 (step S411 to step S412).

The priority updating unit 130 determines whether all priority information is read from the program-priority DB 136 (step S413). When all priority information are not read from the program-priority DB 136, the process returns to step S407, and the priority updating unit 130 reads the next priority information. When all priority information is read from the program-priority DB 136, the process ends.

As described above, when the priority updating unit 130 updates the priority of the program based on the value of the performance index of the program and the reference value of the performance index, the priority of the program can be set based on a level of effective utilization of a parallel computer.

Figure 16:
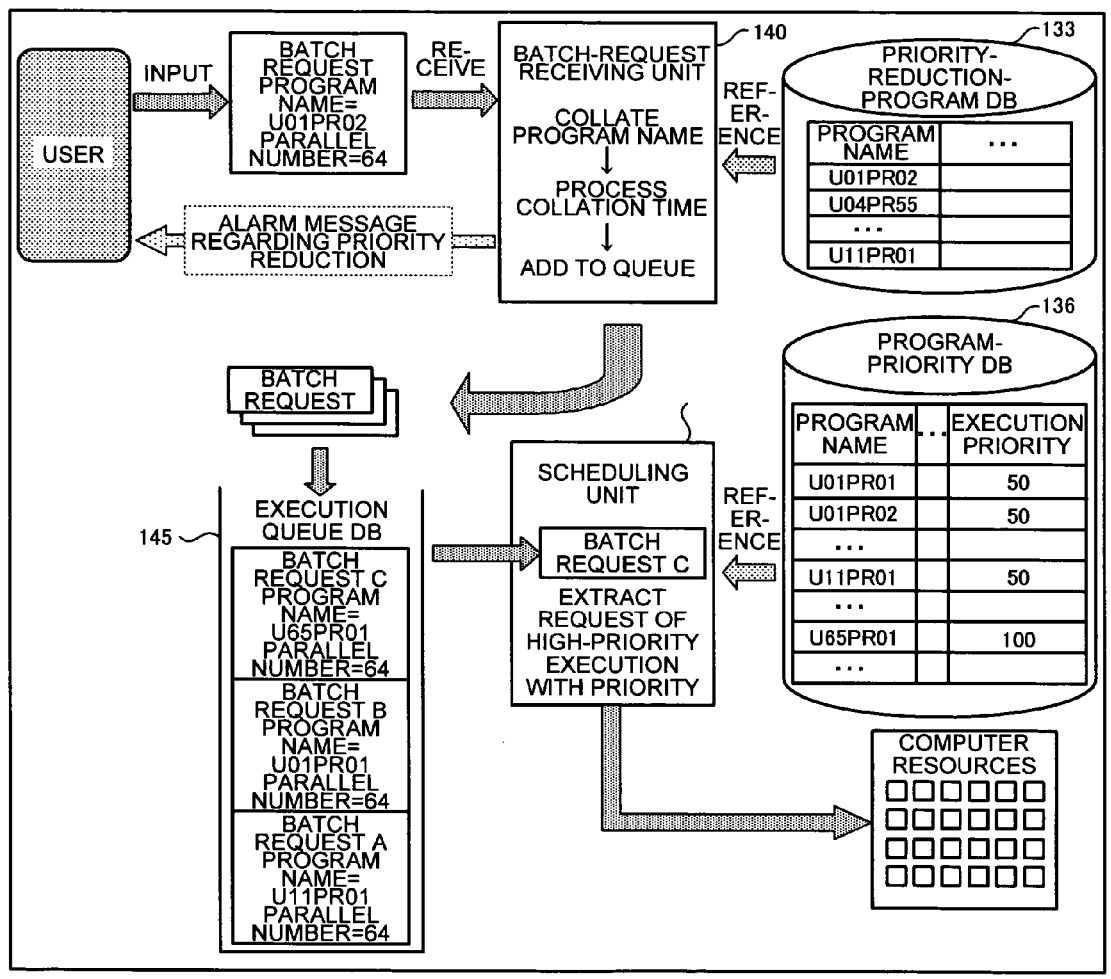
FIG. 16 is an exemplary diagram of a batch request scheduling performed by the batch scheduling apparatus according to the present embodiment.

FIG. 16 is an exemplary diagram of the batch request scheduling performed by the batch request scheduling device 100 according to the present embodiment.

As shown in FIG. 16, upon receiving a batch request from a user, the batch-request receiving unit 140 stores the received batch request into the execution-queue DB 145, and collates the program name of the batch request with the priority-reduction-program DB 133. When the program name collates with the priority-reduction-program DB 133, the batch-request receiving unit 140 issues an alarm message regarding a priority reduction to the user.

In this example, a program name "U01PR02" of the received batch request is registered in the priority-reduction-program DB 133. Therefore, the batch-request receiving unit 140 issues an alarm message regarding a priority reduction to the user.

The scheduling unit 150 obtains priorities of programs of the batch requests stored in the execution-queue DB 145 by referring to the program-priority DB 136, and determines a program to which a computer resource is to be allocated based on the obtained priority.

In this example, a batch request A, a batch request B, and a batch request C are present in the execution-queue DB 145. Priorities of these batch requests are "50", "50", and "100" respectively. The batch request C is assumed to be the program to which the computer resource is to be allocated. In this example, the priority "50" indicates the priority "low", and the priority "100" indicates the priority "high".

As described above, according to the present embodiment, the performance aggregating unit 110 aggregates performance indices of each program using job accounting information, and stores the aggregated performance indices as program performance information into the program-performance DB 115. The reference-value adjusting unit 120 adjusts reference values so that the number of programs of which priorities are "high" becomes constant based on the program performance information of each program. The priority updating unit 130 updates the priority of each program based on the program performance information and the reference value. Therefore, the priority of the program can be determined based on the level of effective utilization of the parallel computer.

Furthermore, according to the present embodiment, the priority updating unit 130 stores information of a program of which priority decreases into the priority-reduction-program DB 133. The batch-request receiving unit 140 collates the program name of the batch request received from the user with the priority-reduction-program DB 133. When the program collates with the priority-reduction-program DB 133, the batch-request receiving unit 140 notifies a reduction of the priority to the user so the user recognizes the reduction of the priority, thereby urging the user to improve the program.

While the batch scheduling apparatus is explained in the present embodiment, a batch scheduling program having similar functions can be also obtained by realizing a configuration of the batch scheduling apparatus with software.

Figure 17:
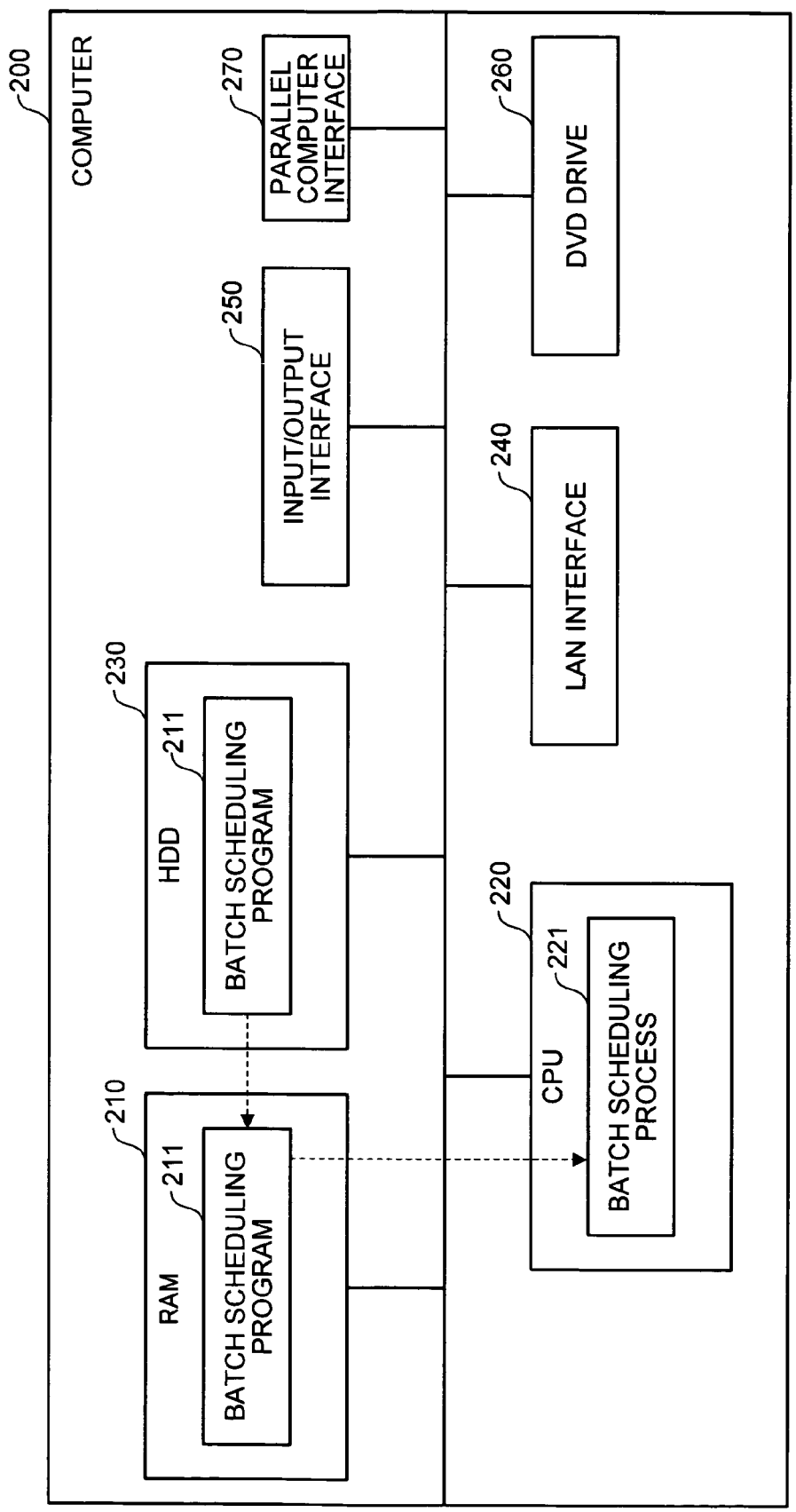
FIG. 17 is a functional block diagram of a configuration of a computer that executes the batch scheduling program according to the present embodiment.
Figure 18:
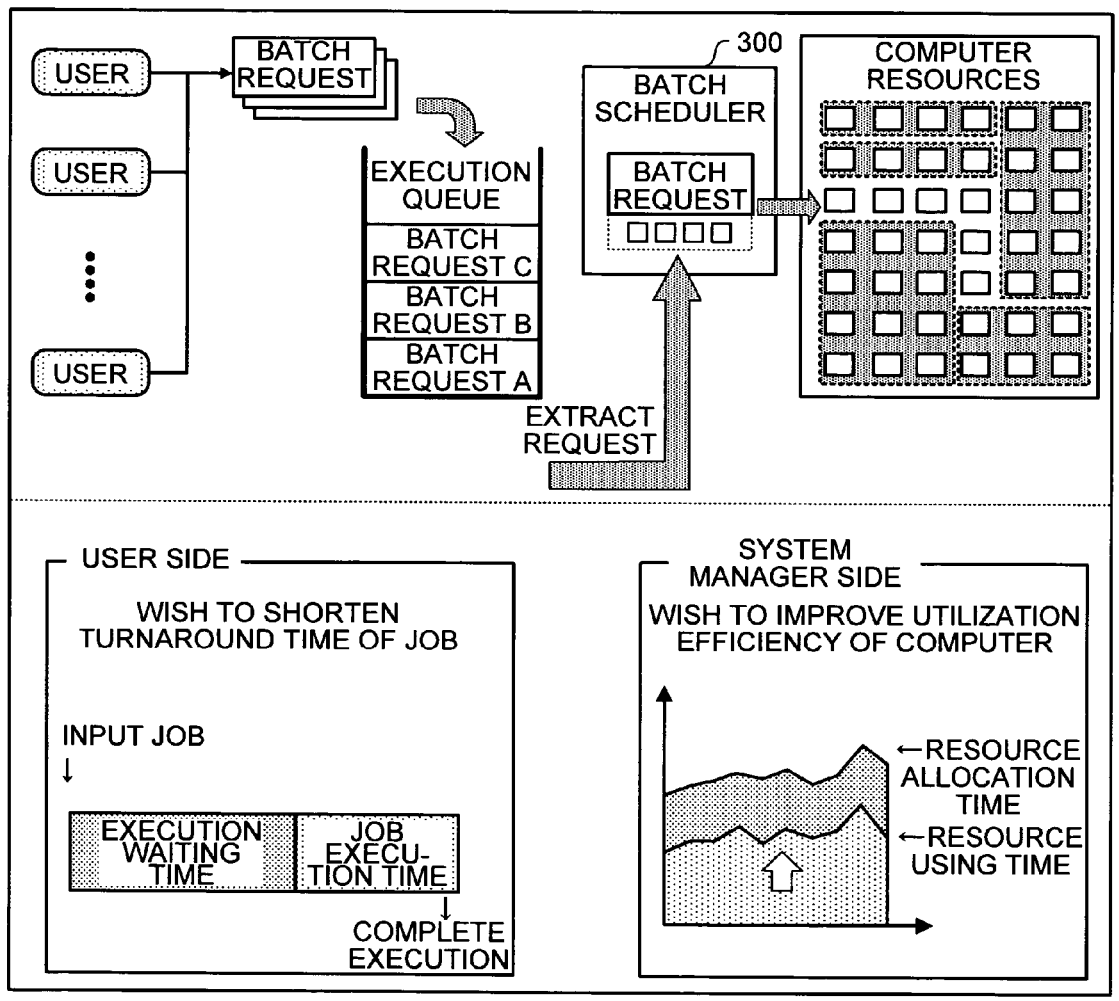
FIG. 18 is an explanatory diagram of a batch job scheduling performed by a parallel computer system.

FIG. 17 is a functional block diagram of a configuration of the computer that executes the batch scheduling program according to the present embodiment. As shown in FIG. 17, a computer 200 has a random access memory (RAM) 210, a CPU 220, a hard disk drive (HDD) 230, a local area network (LAN) interface 240, an input/output interface 250, a digital versatile disk (DVD) drive 260, and a parallel computer interface 270.

The RAM 210 is used to store a batch scheduling program 211 and an intermediate result of execution. The CPU 220 reads the batch scheduling program 211 from the RAM 210, and executes this program.

The HDD 230 is used to store the batch scheduling program 211 and data. The LAN interface 240 connects the computer 200 to other computers via the LAN.

The input/output interface 250 connects an input device such as a mouse and a keyboard and a display device. The DVD drive 260 reads data from and writes data into the DVD. The parallel computer interface 270 communicates with the parallel computer.

The batch scheduling program 211 executed by the computer 200 is stored into the DVD. The DVD drive 260 reads the batch scheduling program 211 from the DVD, and installs this program into the computer 200.

Alternatively, the batch scheduling program 211 is stored into a database of other computer systems and the like connected via the LAN interface 240. The batch scheduling program 211 is read from this database, and is installed into the computer 200.

The installed batch scheduling program 211 is stored into the HDD 230, and is read to the RAM 210. The CPU 220 executes the batch scheduling program 211 in a batch scheduling process 221.

According to the present invention, a user is motivated to create a parallel program considering efficient utilization of the parallel computer. Therefore, utilization efficiency of the parallel computer can be improved.

Furthermore, according to the present invention, the user is made to recognize a reduction in the priority. Therefore, the user can be urged to create a parallel program considering efficient utilization of the parallel computer.

Moreover, according to the present invention, utilization efficiency of hardware resources of the parallel computer is evaluated comprehensively. Therefore, utilization efficiency of the parallel computer can be improved comprehensively.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A non-transitory computer-readable recording medium that stores a computer program for scheduling a parallel program to be executed as a batch job by a parallel computer, wherein the computer program, when executed by a processor, causes a computer to execute a method comprising:

determining a priority of the parallel program based on a parallelization efficiency that is defined as (a sum of execution times of a plurality of CPUs that are utilized to execute the parallel program during the execution of the parallel program)÷(the maximum execution time among the execution times of the plurality of CPUs that are utilized to execute the parallel program)÷(number of the CPUs); and scheduling the parallel program based on the priority determined,
wherein the determining includes:
   determining priorities of a predetermined number of parallel programs as high priorities, and priorities of other parallel programs as low priorities, and
   determining threshold values in such a way that a predetermined number of parallel programs achieve the respective threshold values for all of the parallelization efficiency, a cache miss rate, and a floating-point-operation performance, and
   setting priorities of the predetermined number of parallel programs that achieves the respective threshold values as high priorities,
wherein the threshold values are the values used for determining the priorities of the parallel programs as high or low.

2. The non-transitory computer-readable recording medium according to claim 1, wherein the determining includes determining the priority at a predetermined frequency, and
   the computer program further causes the computer to execute checking whether the priority determined at the determining is lower than a priority determined last time; and
   notifying a decrease of priority to a user who input a parallel program of which the priority is determined to have decreased at the checking as a batch job.

3. The non-transitory computer-readable recording medium according to claim 2, wherein the notifying includes notifying, when the parallel program of which the priority is determined to have decreased at the checking is input as a batch job, the decrease of priority to a user.

4. The non-transitory computer-readable recording medium according to claim 1, wherein the computer program further causes the computer to execute calculating a value of the parallelization efficiency based on job accounting information that includes the execution times of the plurality of CPUs.

5. A method of scheduling a parallel program to be executed as a batch job by a parallel computer, the method comprising:
   determining a priority of the parallel program based on a parallelization efficiency that is defined as (a sum of execution times of a plurality of CPUs that are utilized to execute the parallel program during the execution of the parallel program)÷(the maximum execution time among the execution times of the plurality of CPUs that are utilized to execute the parallel program)÷(number of the CPUs); and
scheduling the parallel program based on the priority determined,
wherein the determining includes:
   determining priorities of a predetermined number of parallel programs as high priorities, and priorities of other parallel programs as low priorities, and
   determining threshold values in such a way that a predetermined number of parallel programs achieve the respective threshold values for all of the parallelization efficiency, a cache miss rate, and a floating-point-operation performance, and
   setting priorities of the predetermined number of parallel programs that achieves the respective threshold values as high priorities,
wherein the threshold values are the values used for determining the priorities of the parallel programs as high or low.

6. A batch scheduling apparatus comprising:
a non-transitory computer-readable recording medium that stores a computer program, wherein the computer program, when executed by a processor, performs a scheduling method of a parallel program to be executed as a batch job by a parallel computer, the batch scheduling apparatus performing the scheduling method including:
determining a priority of the parallel program based on a parallelization efficiency that is defined as (a sum of execution times of a plurality of CPUs that are utilized to execute the parallel program during the execution of the parallel program)÷(the maximum execution time among the execution times of the plurality of CPUs that are utilized to execute the parallel program)÷(number of the CPUs); and
scheduling the parallel program based on the priority determined,
wherein the determining includes:
   determining priorities of a predetermined number of parallel programs as high priorities, and priorities of other parallel programs as low priorities, and
   determining threshold values in such a way that a predetermined number of parallel programs achieve the respective threshold values for all of the parallelization efficiency, a cache miss rate, and a floating-point-operation performance, and
   setting priorities of the predetermined number of parallel programs that achieves the respective threshold values as high priorities,
wherein the threshold values are the values used for determining the priorities of the parallel programs as high or low.

* * * * *